E. Lindner,
Breech Loader.

No 1054. Reissued Oct 2, 1860.

Witnesses.
W. Fairfax.
Geo. W. Stewart

Inventor.
Edward Lindner by
A. Blake his atty

UNITED STATES PATENT OFFICE.

EDWARD LINDNER, OF NEW YORK, N. Y.

IMPROVEMENT IN BREECH-LOADING FIRE-ARMS.

Specification forming part of Letters Patent No. 23,378, dated March 29, 1859; Reissue No. 1,054, dated October 2, 1860.

DIVISION B.

*To all whom it may concern:*

Be it known that I, EDWARD LINDNER, of the city, county, and State of New York, have invented a new and useful Improvement in Breech-Loading Guns or Cannons; and I do hereby declare the following to be a full and exact description of the same, reference being had to the accompanying drawings, which form part of this specification, and in which—

Figure 3:
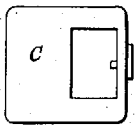
Figure 2:
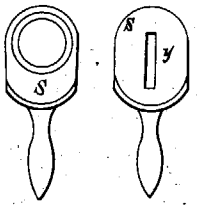
Figure 1:
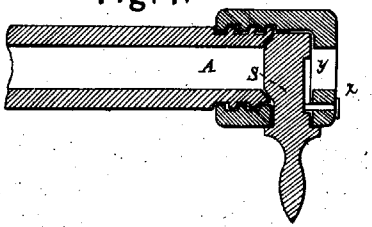

Figure 1 represents a sectional elevation of a cannon or piece of heavy ordnance in part with my improvement applied to it; and Figs. 2 and 3, views of a shifting breech-piece and the hollow screw, forming my improvement, in detail or detached.

My improvement consists in the employment of a hollow screw arranged to fit the rear end of the gun-barrel, and operating in connection with a shifting breech-piece, whereby the load or cartridge may be inserted from the rear through the hollow screw, without of necessity removing the latter from the barrel, and whereby said hollow screw is made to firmly lock the shifting breech-piece, and to make close or tight the joint at the breech, and increased facility afforded for loading or cleaning the gun with dispatch. Said improvement is applicable both to heavy ordnance and to guns or cannon of smaller caliber.

In the accompanying drawings, A represents the gun-barrel, and C the hollow screw arranged to fit the rear end of the barrel. Said hollow screw is here shown as formed with a female thread to gear with a male thread on the end of the barrel, so as to adapt my improvement to muzzle-loading cannons or guns now in use by cutting off the rear ends of the barrels thereof and turning or cutting a screw-thread on the outside of the back end of the remaining portion of the barrel for the hollow screw or screw-sleeve to fit in. This arrangement is also applicable to new guns or, where the same are specially constructed, to have applied to them my improvement, by forming the back end of the barrel open and of sufficient diameter or thickness, the relative position of the male and female screw-threads on the barrel and its hollow screw may be reversed, the effect or operation being the same whether the barrel have the female thread and the hollow screw the male thread or the barrel the male and the hollow screw the female thread.

S is the shifting breech-piece arranged to fit through a slot in the hollow screw C, and made to extend outside of the latter, and formed with a handle, whereby said breech-piece may be used alike to close and open the end of the barrel and to turn the hollow screw, which locks and releases the breech-piece. This breech-piece S is or may be shifted from closing the rear end of the barrel by first turning the hollow screw C partly or wholly round in a direction to unscrew it from the barrel, to relieve the hollow screw from locking the breech-piece in or against the end of the barrel, and then transversely sliding said breech-piece outward. To close the breech, the action is reversed by shoving inward the breech-piece S, and then turning it by its handle so as to make the hollow screw lock it in or against the barrel.

I prefer that the slot in the hollow screw C, for the breech-piece S to fit through, should only be made in one side (not through) said screw, to avoid weakening the hollow screw, likewise reducing the number of vents for leakage, and whereby the opposite side of the hollow screw to the slot may, if desired, serve as a stop to arrest the inward thrust of the breech-piece at its proper point or line for closing against the barrel. Said breech-piece need not be entirely removable from the hollow screw when it is desired to open the breech; but may, when sufficiently open to insert the charge, be stopped by a screw, *x*, arranged to enter a slot, *y*, in the breech-piece. Such or other equivalent provision admits of the breech-piece being removed altogether, when that is desired, by simply slackening or taking out the screw *x*, but retains the breech-piece to its connection with the gun when using the latter, and keeps it from dropping out or being lost or displaced both when the gun is being worked and when standing idle. Likewise, when the breech is opened, insures the breech-piece S closing the slot through which it works in the hollow screw, and making it form a flush or suitable continuation of the interior of the barrel, to prevent interruption to the insertion of the cartridge, or the cartridge from falling through the slot in the hollow screw, when charging the gun.

The breech-piece *s* should be provided with a suitable face-packing, or be of conical shape at its front, to establish a tight joint at the rear end of the barrel, which should be beveled to fit it. Likewise the barrel may be provided at its rear end with a packing-ring fitting in an annular recess cut on the interior edge thereof, which ring should be of soft metal if the face of the breech-piece be of hard metal, or if the latter be of soft, then the ring may be of hard, metal.

By the employment of a hollow screw in place of a solid one to lock or close the breech, the taking out or disconnection of the screw to load the gun is avoided and other advantages obtained, while the value of loading or cleansing the gun from the rear, especially in fortifications and on board ship, is too well known to need comment here.

By the use of the hollow screw a single turn may suffice to open or close the breech, or to admit of its being opened or closed, while with the solid screw or plug to the breech, as previously used, many turns are required. The value of the screw as a fastening for such purposes over or as compared with wedges and other devices is freely admitted.

I have not here shown or described any particular arrangement of priming-channel to the gun, as such forms no part of my invention. It may run in a direct manner through the breech-piece from the back or down the side of the breech-piece, or in any other suitable way.

What I here claim as my invention is—

The employment of a hollow screw arranged to fit the rear end of the barrel, and serving to lock and open a suitable shifting breech-piece, substantially as and for the purpose or purposes herein set forth.

EDWARD LINDNER.

Witnesses:

A. POLLAK,

W. FAIRFAX.